(12) United States Patent
Qin et al.

(10) Patent No.: US 8,825,076 B2
(45) Date of Patent: Sep. 2, 2014

(54) METHOD AND DEVICE FOR POSITIONING TERMINAL IN LONG TERM EVOLUTION SYSTEM

(75) Inventors: Fei Qin, Beijing (CN); Shaohui Sun, Beijing (CN); Yu Ding, Beijing (CN); Tamrakar Rakesh, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 580 days.

(21) Appl. No.: 13/201,178

(22) PCT Filed: Feb. 4, 2010

(86) PCT No.: PCT/CN2010/070513
§ 371 (c)(1),
(2), (4) Date: Sep. 30, 2011

(87) PCT Pub. No.: WO2010/091625
PCT Pub. Date: Aug. 19, 2010

(65) Prior Publication Data
US 2012/0015669 A1    Jan. 19, 2012

(30) Foreign Application Priority Data

Feb. 12, 2009   (CN) .......................... 2009 1 0077471

(51) Int. Cl.
*H04W 24/00*    (2009.01)
*H04M 11/04*    (2006.01)

(52) U.S. Cl.
USPC ..................................... 455/456.1; 455/404.2

(58) Field of Classification Search
CPC ..................................................... H04W 24/00
USPC ....................................................... 455/456.1
See application file for complete search history.

(56) References Cited

FOREIGN PATENT DOCUMENTS

| | | |
|---|---|---|
| CN | 1292204 | 4/2001 |
| CN | 1444833 | 9/2003 |
| CN | 1576877 | 2/2005 |
| CN | 1744763 | 3/2006 |
| CN | 101489180 | 7/2009 |
| EP | 1030531 | 8/2000 |

OTHER PUBLICATIONS

International Search Report for PCT Application No. PCT/CN2010/070513 dated May 6, 2010.

*Primary Examiner* — Huy C Ho
(74) *Attorney, Agent, or Firm* — Foley & Lardner LLP; James F. Ewing; Paul M. H. Pua

(57) ABSTRACT

A method and an apparatus for terminal locating in long term evolution system are provided by the present invention, wherein, the method includes: calculating the propagation delay from the terminal to the base station to which the terminal belongs, according to the synchronization time advance of the terminal and the signal reception delay of the base station to which the terminal belongs (101); and determining the distance between the terminal and the base station by using said propagation delay, and determining the position of the terminal relative to that of the base station according to said distance and the direction of arrival of the signal from the terminal (102). By applying the method and the apparatus provided by the present invention, the terminal locating can be achieved with low cost, low implementation complexity, and high precision for location only by using a simple algorithm.

20 Claims, 4 Drawing Sheets

METHOD AND DEVICE FOR POSITIONING TERMINAL IN LONG TERM EVOLUTION SYSTEM

CROSS-REFERENCE TO RELATED APPLICATIONS

The present application is a US National Stage of International Application No. PCT/CN2010/070513, filed 4 Feb. 2010, designating the United States, and claiming priority to Chinese Patent Application No. 200910077471.1 filed 12 Feb. 2009. The contents of the foregoing applications are hereby incorporated herein by reference in their entireties.

FIELD OF THE INVENTION

The present invention relates to the field of mobile communications and particularly to a method and device for positioning a terminal in a long term evolution system.

BACKGROUND OF THE INVENTION

It is highly required in a Long Term Evolution (LTE) system to position a terminal. At present, there are the following several general methods for positioning a terminal.

In a first method based upon positioning with a Global Position System (GPS), a GPS device is installed in a terminal to thereby acquire and report to the system the current position of the terminal.

In a second method based upon positioning with a system cell, a rough position of a terminal can be acquired by referring to a station address of a current serving cell of the terminal because the station addresses of serving cells are typically known during deployment of a communication system.

In a third method based upon positioning with Observed Time Difference of Arrival (OTDOA), a terminal measures concurrently transmission time differences of more than three nearby cells and multiplies the transmission time differences by transmission velocity (the velocity of light c) to derive distance differences and hereby plane curve equations of the position of the terminal, and the position of the terminal can be derived from an intersection of curves corresponding to the plane curve equations of the cells.

Among the foregoing three methods, the first method with relatively high precision of positioning has to rely upon the expensive GPS device, and this method is costly to implement and relies upon the required capability of the terminal to receive a GPS signal; the second method has too low precision of positioning, especially in a macro cell with a large coverage area of a base station; and the third method with relatively high complexity of measurement requires concurrent measurement and reporting by the terminal of the transmission time differences of three nearby cells, which may result in significant signaling overhead, furthermore, the terminal centered in a cell may measure a surrounding cell with a considerable error due to an interference and a signal strength.

SUMMARY OF THE INVENTION

In view of this, the invention provides a method and device for positioning a terminal in an LTE system to offer the advantages of a low cost, high precision and low complexity.

A method for positioning a terminal in an LTE system includes:

A. calculating, from a synchronization timing advance of the terminal and a signal reception delay of a serving base station of the terminal, a transmission delay of the terminal to the base station; and B. determining, from the calculated transmission delay, a distance of the terminal from the base station and determining, from the distance and an angle of arrival of a signal of the terminal, a position of the terminal relative to the base station.

A device for positioning a terminal in an LTE system includes a first information acquisition unit, a transmission delay calculation unit, a distance calculation unit and a position determination unit, wherein:

the first information acquisition unit is configured to acquire a synchronization timing advance of the terminal, a signal reception delay of a serving base station of the terminal and an angle of arrival of a signal of the terminal;

the transmission delay calculation unit is configured to calculate, from the synchronization timing advance of the terminal and the signal reception delay, a transmission delay of the terminal to the base station;

the distance calculation unit is configured to determine, from the transmission delay calculated by the transmission delay calculation unit, a distance of the terminal from the base station; and the position determination unit is configured to determine, from the distance determined by the distance calculation unit and the angle of arrival of the signal of the terminal acquired by the first information acquisition unit, a position of the terminal relative to the base station.

As can be apparent from the foregoing technical solutions, in the method and device according to the invention, the transmission delay of the terminal to its serving base station is calculated from the synchronization timing advance of the terminal and the signal reception delay of the serving base station of the terminal, the distance of the terminal from the base station is determined from the transmission delay, and the position of the terminal relative to the base station is determined from the distance and the angle of arrival of the signal of the terminal. The device according to the invention can position the terminal in a simple algorithm at a greatly lowered cost as compared with a GPS device, and since all the parameters used in the invention, i.e., the synchronization timing advance of the terminal, the signal reception delay of the base station and the angle of arrival of the signal of the terminal, are measured parameters already present in the system and no value of any additional measurement parameter is required, good compatibility with an existing system can be achieved with low implementation complexity, and all these parameters can be precise to an elementary time unit $T_s$ of the LTE system, approximately $1/(15000 \times 2048)$ second, thereby resulting in high precision of positioning.

DETAILED DESCRIPTION OF THE EMBODIMENTS

The invention will be described in details hereinafter with reference to the drawings and embodiments thereof to make the objects, technical solutions and advantages of the invention more apparent.

Figure 1:
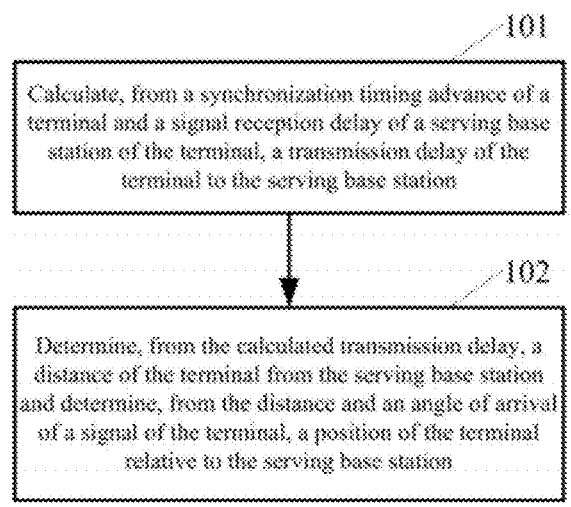
FIG. 1 is a flow chart of a general method according to the invention.

A method according to the invention may be as illustrated in FIG. 1 and generally include the following steps.

The step 101 is to calculate, from a synchronization timing advance of a terminal and a signal reception delay of a serving base station of the terminal, a transmission delay of the terminal to the base station.

The step 102 is to determine, from the calculated transmission delay, a distance of the terminal from the serving base station and to determine, from the distance and an angle of arrival of a signal of the terminal, a position of the terminal relative to the serving base station.

Figure 2:
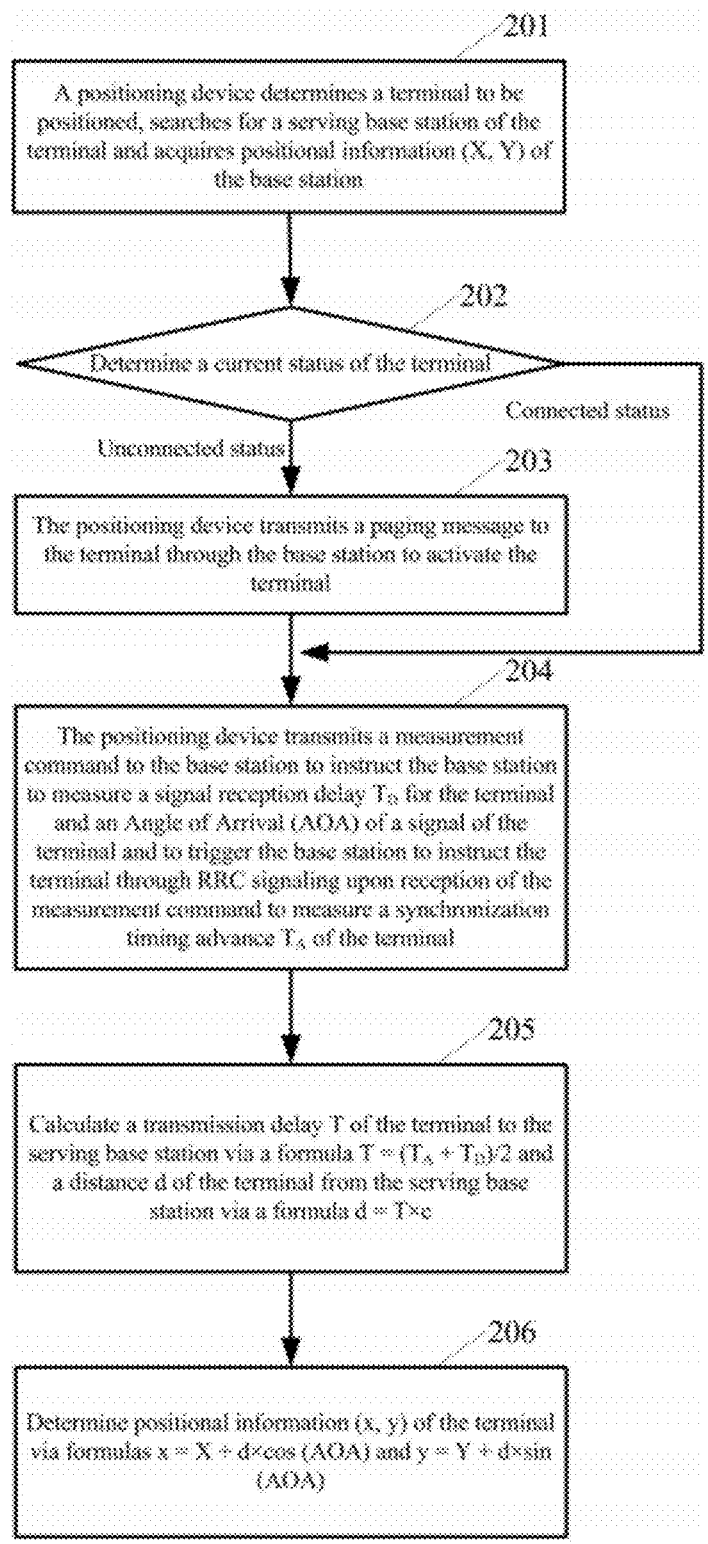
FIG. 2 is a flow chart of a specific method according to an embodiment of the invention.

The method according to the invention will be detailed below with reference to the embodiments thereof. FIG. 2 is a flow chart of a specific method according to an embodiment of the invention, and as illustrated in FIG. 2, the method may include the following steps.

In the step 201, a positioning device determines a terminal to be positioned, searches for a serving base station of the terminal and acquires positional information (X, Y) of the base station.

Information on serving base stations of terminals can be retrieved from a data base of a system to which the terminals have already accesses.

Although positional information of the terminals can not be determined directly, positional information of the base stations in a network keeps unchanged, so the positional information of the terminals can be acquired indirectly from the positional information of the serving base stations of the terminals.

In this embodiment, the positional information of the serving base station of the terminal may be identified with coordinates (X, Y) in a coordinate system.

The step 202 is to determine a current status of the terminal, and if the terminal is in an unconnected status, the flow goes to the step 203, or if the terminal is in a connected status, the flow goes to the step 204.

In the step 203, the positioning device transmits a paging message to the terminal through the base station to activate the terminal.

If the terminal is in an unconnected status, firstly the terminal shall be activated to perform a subsequent task of measuring parameters, or if the terminal is in a connected status, the subsequent task of measuring parameters may be performed directly.

Particularly in this step, the positioning device transmits to the base station a paging message including an ID of the terminal to be activated; and the base station transmits the paging message to the terminal to be activated according to the ID of the terminal included in the paging message upon reception of the paging message. In this step, the base station receives and transmits the paging message in a transparent transport process.

In the step 204, the positioning device transmits a measurement command to the base station to instruct the base station to measure a signal reception delay $T_D$ for the terminal and an Angle of Arrival (AOA) of a signal of the terminal and to trigger the base station to instruct the terminal through Radio Resource Control (RRC) signaling upon reception of the measurement command to measure a synchronization timing advance $T_A$ of the terminal; and the positioning device acquires measurement results of the terminal and the base station.

The base station instructs the terminal through RRC signaling upon reception of the measurement command to measure the synchronization timing advance $T_A$, and the base station measures, from an uplink signal of the terminal, the signal reception delay $T_D$ and the Angle of Arrival (AOA) of the signal of the terminal. Particularly, the base station may measure the signal reception delay $T_D$ from an uplink optical signal which may be an uplink Sounding Reference Signal (SRS), an uplink random access signal, an uplink data traffic signal, or an uplink control channel signal, etc.

Figure 3:
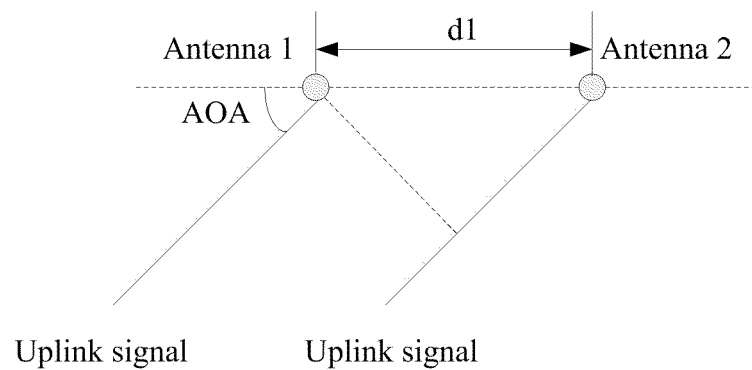
FIG. 3 is a schematic diagram of measuring of an angle of arrival of a signal according to an embodiment of the invention.

The base station may measure the Angle of Arrival (AOA) of the signal of the terminal by estimating it from signal phase differences of antennas, and as illustrated in FIG. 3, a distance between an antenna 1 and an antenna 2 is d1, the angle of arrival is AOA, and the phase difference of signals over the antenna 1 and the antenna 2 is θ, so d1×cos(AOA)=λ×θ/2π, where λ is a wavelength of a carrier and π is the ratio of the circumference of a circle to its diameter, so $$AOA = \cos^{-1}\left(\frac{\lambda \times \theta}{2\pi \times d1}\right).$$

Upon reception of the RRC signaling instructing to measure the synchronization timing advance, the terminal reports the synchronization timing advance $T_A$ which is an integer multiple of $16T_S$ in the LTE system, where $T_S$ is an elementary time unit of the LTE system, typically $T_S=1/(15000\times2048)$ second.

Furthermore, the foregoing measurement process may be one-time measurement or perform a plurality of measurements and then a smoothing process thereon, e.g., averaging thereof, or taking the median thereof.

The step 205 is to calculate a transmission delay T of the terminal to the serving base station via a formula $T=(T_A+T_D)/2$ and a distance d of the terminal from the serving base station via a formula d=T×c, where c is the velocity of light.

In the LTE system, the terminal acquires a downlink reference clock by receiving a downlink special signal transmitted periodically from the base station, and due to the transmission delay T from transmission of the base station to reception of the terminal, the transmission delay from transmission of the terminal to reception of the base station is also T. In order to synchronize exactly with the base station the time that the signal is transmitted from the terminal to the base station, the system may perform a closed-loop synchronization process to have the base station transmit a synchronization command to the terminal to have the terminal adjust the time of transmission by an adjusting amount which is the synchronization timing advance $T_A$ of the terminal in the LTE system. The terminal transmits the signal by the synchronization timing advance $T_A$, which arrives at the base station after the transmission delay T, and ideally the time of reception at the base station is exactly synchronized with a clock of the base station. However, no ideal synchronization can be achieved, that is, the signal reception delay $T_D$ may arise, due to a delay of the synchronization command and mobility of the terminal.

Therefore, both of the factors of $T_A$ and $T_D$ shall be considered for the transmission delay T of the terminal to the serving base station, that is, $T=(T_A+T_D)/2$.

Figure 4A:
FIG. 4a is a schematic diagram of a distance without considering a height of a base station according to an embodiment of the invention.
Figure 4B:
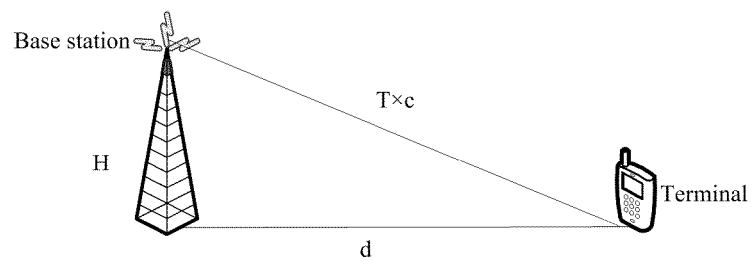
FIG. 4b is a schematic diagram of a distance while considering a height of a base station according to an embodiment of the invention.

Without considering a height of the base station, the distance between the terminal and the base station is $d=T\times c$, as illustrated in FIG. 4a; and while the height H of the base station is considered, the distance of the terminal from the serving base station may be calculated via a formula $d=\sqrt{(T\times c)^2-H^2}$, as illustrated in FIG. 4b.

The step 206 is to determine positional information (x, y) of the terminal via formulas $x=X+d\times\cos(AOA)$ and $y=Y+d\times\sin(AOA)$.

Figure 5:
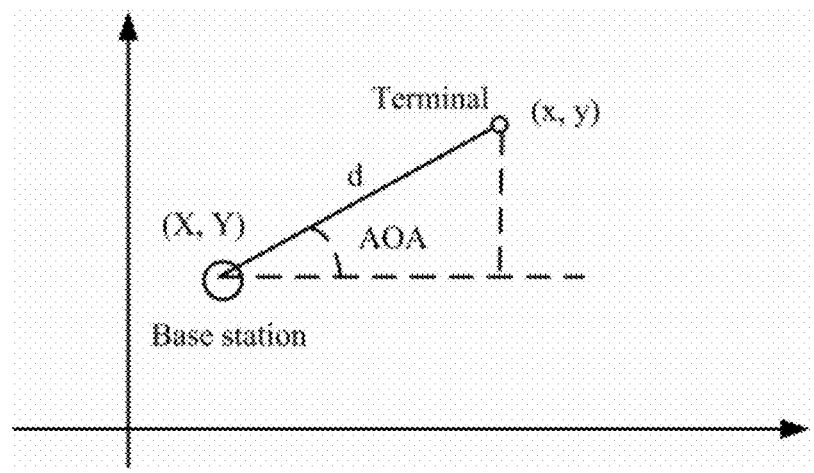
FIG. 5 is a schematic diagram of a geometrical position relationship between a base station and a terminal according to an embodiment of the invention.

With a geometrical relationship in the grid coordinate, the relationship between the position (x, y) of the terminal and the position (X, Y) of the base station may be derived as $x=X+d\times\cos(AOA)$ and $y=Y+d\times\sin(AOA)$, as illustrated in FIG. 5.

The embodiment has been described by taking the grid coordinate as an example, and of course the position of the terminal relative to the serving base station may alternatively be represented in the form of polar coordinate or another form under substantially the same principle without departing from the scope of the invention, and a repeated description thereof will be omitted here.

Figure 6:
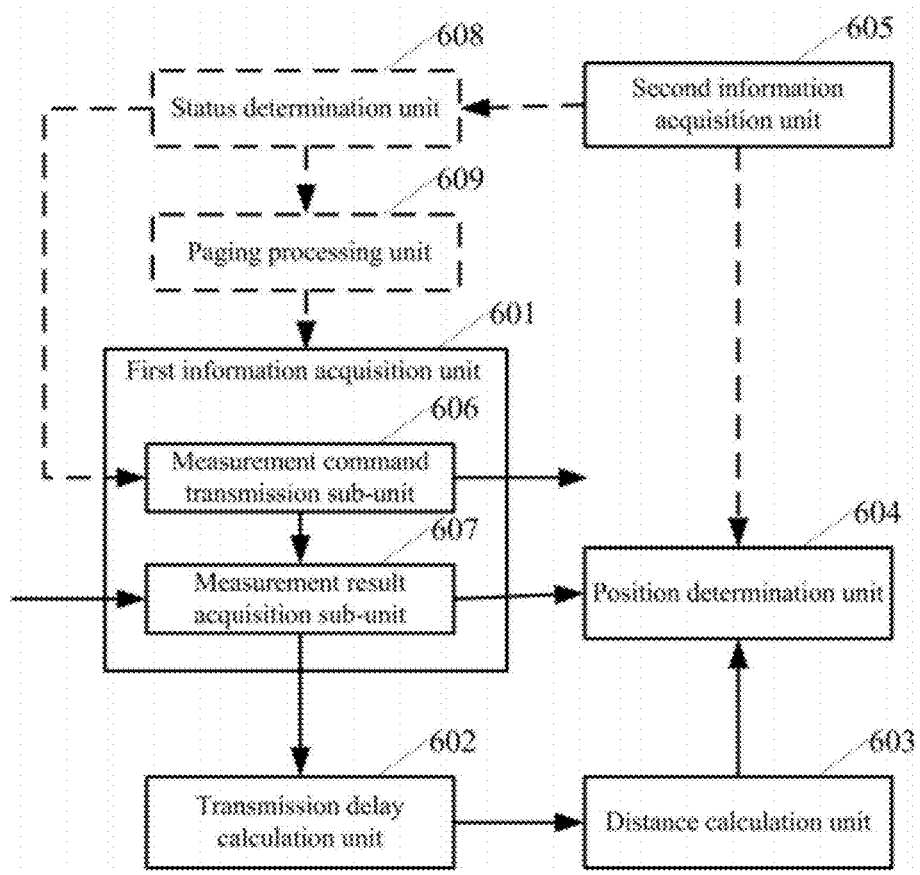
FIG. 6 is a structural diagram of a device according to an embodiment of the invention.

The method according to the invention has been described in details above, and a positioning device according to the invention will be described in details below. As illustrated in FIG. 6, the device may include a first information acquisition unit 601, a transmission delay calculation unit 602, a distance calculation unit 603 and a position determination unit 604.

The first information acquisition unit 601 is configured to acquire a synchronization timing advance of a terminal, a signal reception delay of a serving base station of the terminal and an angle of arrival of a signal of the terminal.

The transmission delay calculation unit 602 is configured to calculate, from the synchronization timing advance of the terminal and the signal reception delay, a transmission delay of the terminal to the base station.

The distance calculation unit 603 is configured to determine, from the transmission delay calculated by the transmission delay calculation unit 602, a distance of the terminal from the base station.

The position determination unit 604 is configured to determine, from the distance determined by the distance calculation unit 603 and the angle of arrival of the signal of the terminal acquired by the first information acquisition unit 601, a position of the terminal relative to the base station.

Furthermore, the device may further include a second information acquisition unit 605 configured to determine the terminal to be positioned, search for the serving base station of the terminal and acquire positional information of the base station, and provide the first information acquisition unit 601 with information on the determined terminal and base station, and provide the position determination unit 604 with the acquired positional information of the base station.

Furthermore, the first information acquisition unit 601 may include a measurement command transmission sub-unit 606 and a measurement result acquisition sub-unit 607.

The measurement command transmission sub-unit 606 is configured to transmit a measurement command to the base station upon reception of the information on the determined terminal and base station to instruct the base station to measure the signal reception delay for the terminal and the angle of arrival of the signal of the terminal, and to trigger the base station to instruct the terminal through RRC signaling upon reception of the measurement command to measure the synchronization timing advance.

The measurement result acquisition sub-unit 607 is configured to acquire measurement results of the terminal and the base station.

Furthermore, the device may further include a status determination unit 608 and a paging processing unit 609.

The status determination unit 608 is configured to determine whether the terminal is in an unconnected status upon reception of the information on the terminal and the base station transmitted from the second information acquisition unit 605, and if so, transmit a processing instruction to the paging processing unit 609; otherwise, transmit the information on the determined terminal and base station to the first information acquisition unit 601.

The paging processing unit 609 is configured to transmit the information on the determined terminal and base station to the first information acquisition unit 601 after transmitting a paging message to the terminal through the base station to activate the terminal upon reception of the processing instruction.

Particularly, the transmission delay calculation unit 602 may calculate the transmission delay T of the terminal to the serving base station via a formula $T=(T_A+T_D)/2$, where $T_A$ is the synchronization timing advance of the terminal and $T_D$ is the signal reception delay.

The distance calculation unit 603 calculates the distance d of the terminal from the serving base station via a formula $d=T\times c$ or $d=\sqrt{(T\times c)^2-H^2}$, where c is the velocity of light and H is the height of the base station.

The position determination unit 604 determines positional information (x, y) of the terminal via formulas $x=X+d\times\cos(AOA)$ and $y=Y+d\times\sin(AOA)$, where (x, y) and (X, Y) are coordinate values of the terminal and the base station in the same grid coordinate system respectively.

The foregoing positioning device according to the invention may be embodied as a separate device or by being arranged in the base station.

As can be apparent from the foregoing description, in the method and device according to the invention, the transmission delay of the terminal to its serving base station is calculated from the synchronization timing advance of the terminal and the signal reception delay of the serving base station of the terminal, the distance of the terminal from the base station is determined from the transmission delay, and the position of the terminal relative to the base station is determined from the distance and the angle of arrival of the signal of the terminal. The device according to the invention can position the terminal in a simple algorithm at a greatly lowered cost as compared with a GPS device, and since all the parameters used in the invention, i.e., the synchronization timing advance of the terminal, the signal reception delay of the base station and the angle of arrival of the signal of the terminal, are measured parameters already present in the system and no value of any additional measurement parameter is required, good compatibility with an existing system can be achieved with low implementation complexity, and all these parameters can be precise to an elementary time unit $T_s$ of the LTE system, approximately $1/(15000\times 2048)$ second, thereby resulting in high precision of positioning.

The foregoing description is merely illustrative of the preferred embodiments of the invention but not intended to limit the invention, and any modifications, equivalent substitutions and adaptations made without departing from the scope and principle of the invention shall be encompassed in the scope of the invention.

The invention claimed is:

1. A method for positioning a terminal in a Long Term Evolution, LTE, system, comprising:
   A. calculating, from a synchronization timing advance of the terminal and a signal reception delay of a serving base station of the terminal, a transmission delay of the terminal to the base station; and
   B. determining, from the calculated transmission delay, a distance of the terminal from the base station and determining, from the distance and an angle of arrival of a signal of the terminal, a position of the terminal relative to the base station.

2. The method of claim 1, further comprising: before the step A,
   a step A1 of determining the terminal to be positioned, searching for the serving base station of the terminal and acquiring positional information of the base station.

3. The method of claim 2, further comprising: between the step A1 and the step A,
   a step A2 of transmitting a measurement command to the base station to instruct the base station to measure the signal reception delay for the terminal and the Angle of Arrival, AOA, of the signal of the terminal and to trigger the base station to instruct the terminal through Radio Resource Control, RRC, signaling upon reception of the measurement command to measure the synchronization timing advance, and acquiring measurement results of the terminal and the base station.

4. The method of claim 3, further comprising: between the step A1 and the step A2, a step A3 of determining whether the terminal is in an unconnected status, and if so, proceeding to the step A2; otherwise, proceeding to a step A4 of transmitting a paging message to the terminal through the base station to activate the terminal and proceeding to the step A2.

5. The method of claim 1, wherein the step A comprises: calculating the transmission delay T of the terminal to the serving base station via a formula $T=(T_A+T_D)/2$, wherein $T_A$ is the synchronization timing advance of the terminal and $T_D$ is the signal reception delay.

6. The method of claim 1, wherein determining from the calculated transmission delay the distance of the terminal from the base station in the step B comprises: calculating the distance d of the terminal from the serving base station via a formula $d=T\times c$ or $d=\sqrt{(T\times c)^2-H^2}$, wherein c is the velocity of light and H is a height of the base station.

7. The method of claim 1, wherein determining the position of the terminal relative to the base station in the step B comprises: determining positional information (x, y) of the terminal via formulas $x=X+d\times\cos(AOA)$ and $y=Y+d\times\sin(AOA)$, wherein (x, y) and (X, Y) are coordinate values of the terminal and the base station in the same grid coordinate system respectively.

8. A device for positioning a terminal in an LTE system, comprising: a first information acquisition unit, a transmission delay calculation unit, a distance calculation unit and a position determination unit, wherein:
   the first information acquisition unit is configured to acquire a synchronization timing advance of the terminal, a signal reception delay of a serving base station of the terminal and an angle of arrival of a signal of the terminal;
   the transmission delay calculation unit is configured to calculate, from the synchronization timing advance of the terminal and the signal reception delay, a transmission delay of the terminal to the base station;
   the distance calculation unit is configured to determine, from the transmission delay calculated by the transmission delay calculation unit, a distance of the terminal from the base station; and
   the position determination unit is configured to determine, from the distance determined by the distance calculation unit and the angle of arrival of the signal of the terminal acquired by the first information acquisition unit, a position of the terminal relative to the base station.

9. The device of claim 8, further comprising: a second information acquisition unit configured to determine the terminal to be positioned, search for the serving base station of the terminal and acquire positional information of the base station, provide the first information acquisition unit with information on the determined terminal and base station and provide the position determination unit with the acquired positional information of the base station.

10. The device of claim 9, wherein the first information acquisition unit comprises a measurement command transmission sub-unit and a measurement result acquisition sub-unit, wherein:
    the measurement command transmission sub-unit is configured to transmit a measurement command to the base station upon reception of the information on the determined terminal and base station to instruct the base station to measure the signal reception delay for the terminal and the angle of arrival of the signal of the terminal and to trigger the base station to instruct the terminal through RRC signaling upon reception of the measurement command to measure the synchronization timing advance; and
    the measurement result acquisition sub-unit is configured to acquire measurement results of the terminal and the base station.

11. The device of claim 9, further comprising: a status determination unit and a paging processing unit, wherein:
    the status determination unit is configured to determine whether the terminal is in an unconnected status upon reception of the information on the terminal and the base station transmitted from the second information acquisition unit, and if so, transmit a processing instruction to the paging processing unit; otherwise, transmit the information on the terminal and the base station to the first information acquisition unit; and
    the paging processing unit is configured to transmit the information on the terminal and the base station to the first information acquisition unit after transmitting a paging message to the terminal through the base station to activate the terminal upon reception of the processing instruction.

12. The device of claim 8, wherein the transmission delay calculation unit calculates the transmission delay T of the terminal to the serving base station via a formula $T=(T_A+T_D)/2$, wherein $T_A$ is the synchronization timing advance of the terminal and $T_D$ is the signal reception delay.

13. The device of claim 8, wherein the distance calculation unit calculates the distance d of the terminal from the serving base station via a formula $d=T\times c$ or $d=\sqrt{(T\times c)^2-H^2}$, wherein c is the velocity of light and H is a height of the base station.

14. The device of claim 8, wherein the position determination unit determines positional information (x, y) of the terminal via formulas $x=X+d\times\cos(AOA)$ and $y=Y+d\times\sin(AOA)$, wherein (x, y) and (X, Y) are coordinate values of the terminal and the base station in the same grid coordinate system respectively.

15. The method of claim 2, wherein the step A comprises: calculating the transmission delay T of the terminal to the serving base station via a formula $T=(T_A+T_D)/2$, wherein $T_A$ is the synchronization timing advance of the terminal and $T_D$ is the signal reception delay.

16. The method of claim 2, wherein determining from the calculated transmission delay the distance of the terminal from the base station in the step B comprises: calculating the distance d of the terminal from the serving base station via a formula $d=T\times c$ or $d=\sqrt{(T\times c)^2-H^2}$, wherein c is the velocity of light and H is a height of the base station.

17. The method of claim 2, wherein determining the position of the terminal relative to the base station in the step B comprises: determining positional information (x, y) of the terminal via formulas $x=X+d\times\cos(AOA)$ and $y=Y+d\times\sin(AOA)$, wherein (x, y) and (X, Y) are coordinate values of the terminal and the base station in the same grid coordinate system respectively.

18. The device of claim 9, wherein the transmission delay calculation unit calculates the transmission delay T of the terminal to the serving base station via a formula $T=(T_A+T_D)/2$, wherein $T_A$ is the synchronization timing advance of the terminal and $T_D$ is the signal reception delay.

19. The device of claim 9, wherein the distance calculation unit calculates the distance d of the terminal from the serving base station via a formula $d=T\times c$ or $d=\sqrt{(T\times c)^2-H^2}$, wherein c is the velocity of light and H is a height of the base station.

20. The device of claim 9, wherein the position determination unit determines positional information (x, y) of the terminal via formulas $x=X+d\times\cos(AOA)$ and $y=Y+d\times\sin(AOA)$, wherein (x, y) and (X, Y) are coordinate values of the terminal and the base station in the same grid coordinate system respectively.

\* \* \* \* \*